United States Patent [19]

Bertram et al.

[11] Patent Number: 4,812,691
[45] Date of Patent: Mar. 14, 1989

[54] DEVICE FOR IMPROVING THE STABILITY OF ROTATION OF THE ROTOR OF A SINGLE-PHASE SYNCHRONOUS MOTOR

[75] Inventors: Leo Bertram, Stolberg, Fed. Rep. of Germany; Hugo Schemmann, Schaesberg, Netherlands; Gerhard Diefenbach, Aachen, Fed. Rep. of Germany

[73] Assignee: U.S. Philips Corp., New York, N.Y.

[21] Appl. No.: 40,448

[22] Filed: Apr. 16, 1987

[30] Foreign Application Priority Data

Mar. 29, 1986 [DE] Fed. Rep. of Germany ....... 3610771

[51] Int. Cl.⁴ .......................... H02K 7/10; H02K 7/118
[52] U.S. Cl. ......................................... 310/41; 318/136
[58] Field of Search ........................... 310/41; 318/136

[56] References Cited

U.S. PATENT DOCUMENTS

| | | | |
|---|---|---|---|
| 3,539,844 | 11/1970 | Linn | 310/41 |
| 3,748,508 | 7/1973 | Woolley | 310/41 |
| 3,842,296 | 10/1974 | Gerber | 310/41 |
| 3,975,652 | 8/1976 | Hammond | 310/41 |
| 3,984,710 | 10/1976 | Poel | 310/41 |
| 4,506,178 | 3/1985 | Bukoschek et al. | 310/41 |
| 4,532,444 | 7/1985 | Gerber et al. | 310/41 |

Primary Examiner—David Smith, Jr.
Attorney, Agent, or Firm—Ernestine C. Bartlett

[57] ABSTRACT

The invention relates to a device for improving the stability of rotation of the rotor of a single-phase synchronous motor mounted in an apparatus housing. The motor exhibits an average motor torque on which strong alternating torques are superimposed and which drives a preferably rotating load. The rotating load may be a small domestic appliance such as a citrus-juice extractor, a knife sharpener, or a dry-shaver with rotatary cutters. The device is constructed in such a way that the rotor is influenced by an additional mechanical compensation torque which acts outside the load-transmission path and which counteracts the electromechanical alternating torques of the motor for a given, preferably positive, direction of rotation of the rotor, the positive direction of rotation being that direction in which the torque exerted on the rotor by the current becomes initially zero and in which subsequently, shifted through a small angle, the magnetic detent torque, which exists when the stator coils are not energized, also becomes zero. And in this position a stable rest position of the rotor is provided and the opposite direction of rotation is blocked. Blocking is effected by means of a unidirectional device.

11 Claims, 2 Drawing Sheets

DEVICE FOR IMPROVING THE STABILITY OF ROTATION OF THE ROTOR OF A SINGLE-PHASE SYNCHRONOUS MOTOR1

FIELD OF THE INVENTION

The invention relates to a device for improving the stability of rotation of the rotor of a single-phase synchronous motor having a detent torque and arranged in an apparatus housing, which motor exhibits an average torque on which strong alternating torques are superimposed and which drives a preferably rotating load, in particular in small domestic appliances.

BACKGROUND OF THE INVENTION

Single-phase synchronous motors, because of their dimensions, their efficiency and because they do not require interference suppression are suitable as a drive motors for apparatus with a rotary working motion. Such apparatus, for example citrus-juice extractors (EP-OS No. 103,930 - PHD No. 82-103 EP). Single-phase synchronous motors are mainly used in those cases where the driven load performs its operating function regardless of the driving direction. This is also the case in apparatus with an oscillating working motion.

In small domestic appliances driven by means of single-phase synchronous motors, the stability of rotation is found to depend to an extent on the direction of rotation of the motor. Strong alternating torques, which impair a stable operation, are superimposed on the average torque. Depending on the starting conditions of a single-phase synchronous motor, it is possible to distinguish between a positive and a negative direction of rotation. The positive direction of rotation is that direction in which the torque exerted on the rotor by the current becomes initially zero and in which subsequently, shifted by a small (positive) angle, the magnetic detent torque, which exists when the stator coils are not energized, also becomes zero, resulting in a stable rest position of the rotor.

In synchronous motor drives, up to now, the rotational stability is generally found to be substantially better for this positive direction of rotation than for the negative direction of rotation. Unfortunately, it appears that statistically single-phase synchronous motors tend to have a preferred starting direction corresponding to the negative direction of rotation.

A further drawback of single-phase synchronous motors is that such a motor is susceptible to starting problems in the case of a frictional load. If the friction torque is larger than the critical detent torque, the rotor may stall, in particular, in the position in which the main field directions of the rotor field and the stator field are parallel.

The critical detent torque is the magnetic torque which is exerted on the rotor when the stator coils are not energized and the rotor is rotated out of its rest position into the position in which the rotor-field and stator-field directions are parallel.

In dry-shavers having rotary cutters, the frictional load may increase considerably as a result of soiling of the shaving heads, which may impair starting. It is known to provide an additional starting aid for a single-phase synchronous motor. This ensures that, for the prevailing friction values, the main-field directions of the rotor field and the stator field are not parallel in the rest position and that starting is possible in this rotor position, which is offset from the parallel position. This offset from the parallel position can be accomplished by means of a cam-and-roller system in which a spring-loaded roller acts on a cam which is connected to the rotor and which is mirror-inverted about its central axis, thereby rotating the cam into a rest position which does not coincide with the parallel position (DE-OS No. 34 04 297 - PHD No. 84-022). Such a starting mechanism is also described in ETZ, Volume 30 (1978), no. 2, pages 56 to 60. From FIG. 2b therein it appears that in the case of a starting aid the overall pulsation torque produced by the spring torque and the detent torque is larger than their individual values. This does not provide for a reduction of speed fluctuations during operation. Moreover, this is not of interest in an apparatus with an oscillating working motion. However, there may be cases in which this is important, for example, when the time-dependence of the oscillating motion is critical.

Even during its synchronous operation, a single-phase synchronous motor exhibits substantial fluctuations in angular velocity of the rotor. The fluctuation amplitude may be up to approximately 40% of the synchronous value. This may be undesirable in certain domestic appliances although, in general, they need not comply with stringent requirements with respect to the stable operation. For example, in dry-shavers with rotary cutters, if the speed becomes smaller than a specific minimum speed, there may be an adverse effect - - - - - on the chance that a beard hair is caught and subsequently severed. Further, such speed fluctuations may give rise to annoying noises. The latter may also occur in shavers with an oscillating cutter motion.

In view of this, DE-PS No 14 88 267 proposes a single-phase synchronous motor with an artificially suppressed detent torque. This motor uses an additional magnet, which is rotatably mounted on the shaft, with an associated flux-return iron, whose artificial detent torque compensates for the fluctuation of the current torque in a given operating condition and in one direction of rotation only for providing a substantially constant torque.

This leads to a very intricate rotor construction with a rotor comprising at least two magnet elements which are 90° shifted relative to each other, reducing the useful flux by a factor of $\sqrt{2}$. This reduces the motor power. Moreover, a substantial magnet volume, which must be set into rotation by the motor, is needed in order to produce a compensation torque of the correct phase. In general, this strongly affects the starting performance of the motor, on account of the substantially higher overall mass moment of inertia. In addition, the entire construction becomes more bulky, more intricate and less efficient as a result of the addition of the compensation means, which in fact constitutes a second motor configuration without coils.

Until now speed fluctuations and high friction loads, upon starting, have prohibited the use of single-phase synchronous motors in dry-shavers with rotary cutters on account of the above-mentioned problems with respect to the starting performance, the shaving performance and the noise production.

It is an object of the invention to construct a device of the type defined in the opening paragraph, preferably with a rotary working motion, in such a way that in a simple, compact and efficient manner, the stability of the single-phase synchronous motor is improved to such an extent that fluctuations in angular velocity of the motor are reduced considerably; it is another object to improve the starting performance.

SUMMARY OF THE INVENTION

According to the invention this object is achieved by a device which, for improving the stability of rotation of the rotor of a single-phase synchronous motor, has a detent torque and arranged in an apparatus housing, which motor exhibits an average torque on which strong alternating torques are superimposed and which drives a preferably rotating load, in particular in small domestic appliances, characterized in that the rotor is influenced by an additional mechanical compensation torque which acts outside the load-transmission path and which counteracts the electromechanical alternating torques of the motor during nominal operation in one direction of rotation, and in that, taking into account their phase relationship, the detent torque and the mechanical compensation torque rotate the rotor sufficiently far out of the parallel position of the stator field and the rotor field so as to enable starting for the prevailing starting friction.

In comparison with electromechanical solutions, for example in the form of cam-and-follower mechanisms, this mechanical compensating torque can be obtained in a simple, space-saving and economical manner.

On account of the additional mechanical compensation torque, a single-phase synchronous motor with a detent torque no longer exhibits fluctuations in angular velocity; its performance as regards speed stability and silent operation resembles that of a d.c. motor or a synchronous motor to such an extent that it is suitable for a wider range of applications.

In a further embodiment of the invention the compensation torque counteracts the electromechanical alternating torques of the motor, depending on the direction of rotation, and at the same time, the opposite direction of rotation is blocked. In a further embodiment of the invention, the rotor is influenced by an additional mechanical compensation torque which acts outside the load-transmission path and which counteracts electromechanical alternating torques of the motor in the positive direction of rotation of the rotor. The positive direction of rotation denotes that direction in which the torque exerted on the rotor by the current becomes initially zero and in which subsequently, shifted through a small angle, the magnetic detent torque, which exist when the stator coils are not energized, also becomes zero, while at the same time the rotor occupies a stable rest position, and the opposite direction of rotation is blocked.

When the single-phase synchronous motor can rotate only in its positive direction of rotation and, in addition the mechanical compensation torque acts on the rotor, the motor is particularly suitable for use in apparatus in which a silent operation and a specific direction of rotation are required. This is the case in, for example, dry-shavers comprising cutters which are ground on one side.

In a further embodiment of the invention the additional mechanical compensation torque is provided by a cam-and-follower mechanism comprising a cam arranged on the rotor shaft and one or a plurality of rotatably journalled cam-follower wheel(s) which is (are) resiliently pressed against the cam. Such a cam-and-follower mechanism may act in the load-transmission path, for example in the drive mechanism, where it provides a compensation effect. If one follower wheel is used, it is pressed against the cam by means of an additional spring. If two follower wheels are used, the spring although not needed to maintain the contact, is needed to generate the additional mechanical torque.

In a further embodiment of the invention, blocking is effected by means of a resilient blocking element which bears against a radial surface of the follower wheel or one of the follower wheels, which surface has a blocking surface against which the blocking element abuts in the undesired direction of rotation. Suitably, the blocking element may be an injection-molded plastics part arranged on the same element as the follower wheel.

In a further embodiment of the invention, the harmonics of the electromagnetic motor torque and the mechanical compensation torque have substantially equal amplitudes and are in phase opposition for a predetermined, preferably positive, direction or rotation during nominal operation. As a result of this the harmonics of the alternating toques cancel each other during nominal operation, yielding a substantially more silent operation. If further additional pulsating load torques occur, as in the case of an oscillating working motion, they can be allowed for in a similar way.

In a further embodiment of the invention the relevant follower wheel is resiliently pressed against the cam by means of a compression spring which bears against an abutment, and whose initial pressure and spring constant are selected in such a way that the amplitudes of the harmonics of the electromagnetic motor torque and the mechanical compensation torque are substantially equal. This enables alternating torques to be compensated for by means of a more economical and more compact construction.

In a further embodiment of the invention the angle $\beta$ between the major cam axis and the direction of magnetization of the permanent-magnetic rotor is selected in such a way that during nominal operations of the apparatus the harmonics of the electromagnetic motor torque and the mechanical compensation torque are in phase opposition when their amplitudes are substantially equal in a predetermined, preferably positive, direction of rotation. This enables an optimum adaptation to the load to be obtained by simply rotating the cam. It is then also possible to compensate for pulsating load torques.

An embodiment of the invention will now be described in more detail, by way of example, with reference to the accompanying drawings. In the drawings:

DESCRIPTION OF THE PREFERRED EMBODIMENT

Figure 1:
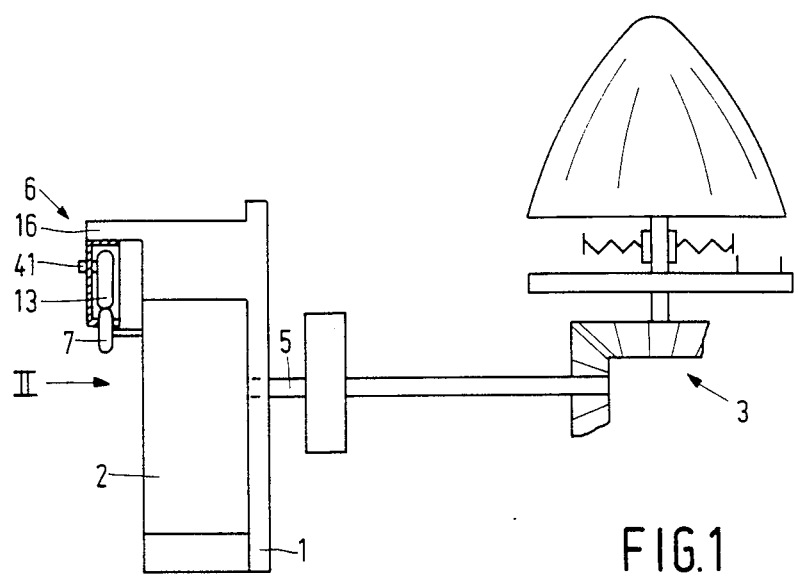
FIG. 1 diagrammatically illustrates the drive of a citrus-juice extractor by means of a single-phase synchronous motor equipped with a device for improving stability.
Figure 3:
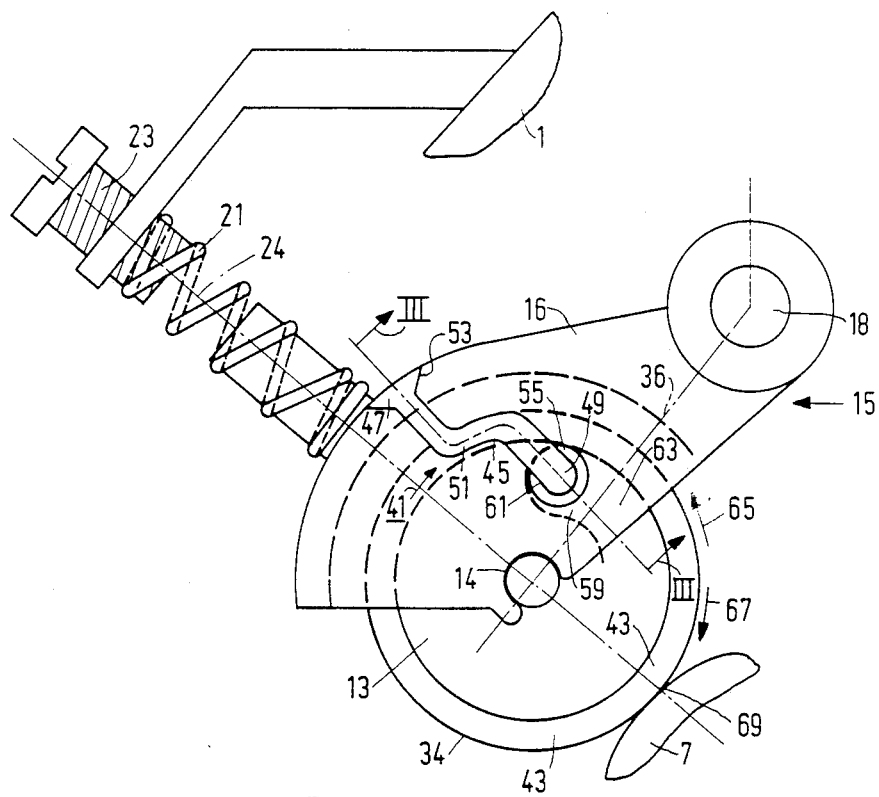
FIG. 3 shows a cam-and-follower mechanism in which a mirror-symmetrical cam mounted on the shaft of the single-phase synchronous motor is followed by means of a follower wheel.
Figure 4:
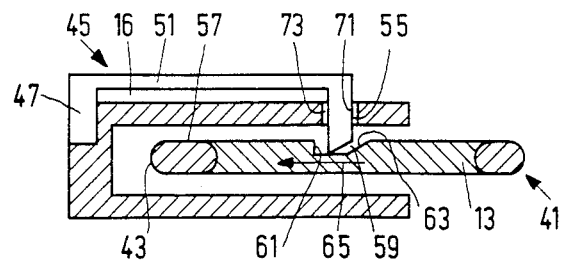
FIG. 4 is a sectional view of the FIG. 3 arrangement taken on the line III—III.

FIG. 1 shows a single-phase synchronous motor 2 which is mounted on a mounting wall 1 and which drives a permanently connected load 3 by means of its rotor shaft 5. The load 3 may be, for example, the pressing cone of a citrus-juice extractor, the grinding wheel of a knife sharpener, or the cutter set of a dry-shaver with rotary cutters. A device 6 for improving the operational stability of the single-phase synchronous motor 2 cooperates with the shaft 5 of the single-phase synchronous motor 2. This device 6 for improving the operational stability is shown in more detail in FIGS. 2 to 4.

Figure 2:
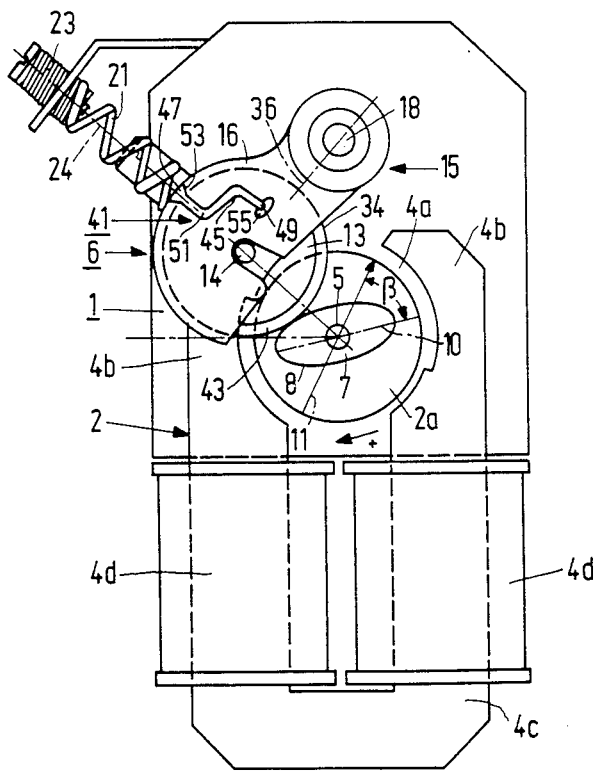
FIG. 2 is a plan view, from side II in FIG. 1, of the single-phase synchronous motor and its device for improving stability.

As is shown in FIG. 2, the rotor 2a of the single-phase synchronous motor 2 rotates in an air gap 4a between pole pieces 4b. Exciter coils 4d are arranged on the U-shaped stator iron 4c with the pole pieces 4b. The drive shaft 5 of the single-phase synchronous motor projects perpendicularly from the rotor 2a at both ends of the rotor 2a. In FIG. 2 it points out of the plane of the drawing. The other end of the drive shaft 5 points towards the other end of the single-phase synchronous motor, into the plane of the drawing in FIG. 2, and drives the load 3. A cam 7 which is mirror-symmetrical with respect to the central axis 10 is mounted on the drive shaft 5. The profile of the cam bears the reference numeral 8 and its major axis is designated 10.

A follower wheel 13, which is journalled in a roller bearing 14 of a cam-and-follower mechanism 15, is pressed against the cam 7. The cam-and-follower mechanism 15 comprises a lever arm 16 which is pivotable about a pivot 18.

In an embodiment, not shown, the lever arm is bifurcated before the roller bearing, each limb of the bifurcation carrying a follower wheel. The mirror-symmetrical cam is constantly in contact with both follower wheels.

A compression spring 21, whose initial pressure is adjustable by means of a set-screw 23, acts against the lever arm 16. The central axis 24 of the pressure spring 21 extends through the motor shaft 5 in the centre position of the cam-and-follower mechanism 15 and extends perpendicularly to the line 36 interconnecting the pivot 18 and the roller bearing 14.

The surface 34 of an elastic friction ring 43 on the follower wheel 13 is pressed against the surface 8 of the cam 7. The pressure is such that the follower wheel 13 cannot come clear of the cam 7 and cannot become so high that it adversely affects the rotation of the rotor 2a.

The torque exerted on the cam 7 and thus on the rotor 2a by the compression spring 21 via the follower wheel 13 acts on the rotor 2a as an additional mechanical compensation torque outside the actual load-transmission path. This mechanical compensation torque counteracts electromechanical alternating torques of the motor, for example in the positive direction of rotation of the rotor. The positive direction of rotation is that direction in which the torque exerted on the rotor by the current becomes initially zero and subsequently, shifted through a small angle, the magnetic detent torque, which exist when the stator coils are not energized, becomes zero and in this position yields a stable rest position of the rotor. The opposite (negative) direction of rotation is then blocked to ensure rotation in the positive direction. The magnetic detent torque is to be understood to mean that torque which opposes a rotation of the rotor magnet when the stator coils are not energized. When the stator coils are not energized the rotor is rotated into a specific rest position relative to the stator poles 4b as a result of the magnetic force exerted by the rotor magnet.

An unidirectional device 41 ensures that in the present example the positive direction of rotation of the rotor is obtained. Device 41 is arranged between the lever arm 16 of the cam-and-follower mechanism 15 and the follower wheel 13, whose circumferential surface is provided with a friction ring 43, which is for example made of rubber. The unidirectional device 41 comprises a blocking element 45 comprising a mounting pin 47, a blocking hook 49 and a resilient bridge 51 (FIGS. 3 and 4) connecting the mounting pin 47 and the blocking hook 49. The mounting pin 47 is captively mounted in a hole 43 in the lever arm 16. The blocking hook 49 extends through and is freely movable in a further hole 55 in the lever arm 16. The resilient bridge 51 constantly urges the hook 49 against a radial surface 57 of the follower wheel 13.

The radial surface 57 of the follower wheel 13 is formed with a recess 59. In the circumferential direction this recess 59 has two differently shaped walls 61 and 63. The wall 61 forms a blocking wall for the latching hook 49 and therefore extends perpendicularly to the radial surface 57. The other wall 53 is an inclined surface over which the hook 49 can slide. This unidirectional device operates depending on the direction of rotation of the motor. When the rotor 2a rotates the follower wheel 13 in the direction indicated by an arrow 65 via the cam 7, the blocking hook 49 continually moves out of the recess 59 via the inclined wall 63. However, if the cam 7 rotates the follower wheel in the direction indicated by the arrow 67, the blocking hook 49 abuts against the blocking wall 61, so that the follower wheel 13 is blocked. When the friction between the surface 34 of the friction ring 43 on the follower wheel 13 and the cam 7 is high enough the follower wheel 13 stalls the rotor 2a. This means that the direction of rotation of the single-phase synchronous motor is reversed. The elastic construction of the friction ring, which merely represents a transmission aid but not a transmission element for the load, ensures that blocking impulses are suppressed and the system is mechanically relieved. The deformation of the surface of the friction ring 43 results in blocking being effected in a quasi-form coupled fashion. The blocking action of the unidirectional device 41 is selected in such a way that the rotor 2a can start only in the preferred direction of rotation, i.e. in the direction of rotation in which the motor including the mechanical compensation system has a better operational stability. Moreover, the noise produced in this direction of rotation is generally more pleasant. Preferably, the rear wall 71 of the blocking hook 49 abuts elastically against the wall 73 of the hole 55. Further, the spring constant and the mass of the unidirectional device 45 should be adapted in such a way that during operation of the device vibrations are minimized and the blocking hook most gently engages with the follower wheel 13. A resilient bridge 51 in the form of a plastics part is very suitable for this purpose. The pressure of the resilient bridge 51 should be dimensioned in such a way that the motor rotation is stabilized, and additional damping means may be dispensed with. The desired pressure can be obtained by the use of an elastic pressure element which is under pretension.

Measures are taken to ensure that the harmonics of the electromagnetic motor torque and the mechanical compensation torque have substantially equal amplitudes and are in phase opposition in the desired, preferably positive, direction of rotation. This is accomplished by producing the resilient action by means of a compression spring 21 which acts against an abutment, the initial pressure and spring constant of this spring being selected in such a way that the amplitudes of the harmonics of the electromagnetic motor torque and the mechanical compensation torque are substantially equal. This also depends on the cam dimensions. The position of the cam 7 relative to the direction of magneticzation of the rotor magnet determines the phase relationship between the torques. Therefore, the angle $\beta$ between the major cam axis 10 and the direction of magnetization 11 of the permanent-magnetic rotor 2a is selected in such a way that during nominal operation of the apparatus the harmonics of the electromagnetic motor torque and the mechanical compensation torque are in phase opposition when their amplitudes are substantially equal in the selected direction of rotation. The amplitude and phase angle of the overall electromagnetic torque can be determined in elementary manner by superimposing the alternating current-torque and the detent torque. Pulsations of the load torque may then also be allowed for.

When such a device is employed for improving the operational stability angular-velocity fluctuations are substantially smaller than the inherent fluctuations of the motor loaded by friction and inertial torques and can be made smaller than a predetermined maximum value. The permissible maximum value then depends mainly on the use and may be substantially smaller, for example, in the order of magnitude of 5 to 10% of the average value of the synchronous angular velocity, than in a motor without compensation steps, in which values up to 40% of the average value may occur.

The friction loads during starting. i.e. the load torque, may exceed the critical detent torque when the auxiliary mechanism is used. The critical detent torque is that magnetic torque which is exerted on the rotor when the coils are not energized and is rotated out of its stable rest position into the position in which the direction of the stator field and the rotor field are parallel. Suitably, the angle $\beta$ is selected so as to obtain both effects, i.e. a reduction of velocity fluctuations during nominal operation for a selected direction of rotation and an improvement of the starting performance in the case of friction. In view of starting, the positive direction of rotation is to be preferred, because in this direction the detent torque and the mechanical auxiliary torque augment one another when the angle $\beta$ is suitably selected.

It is found that by merely adding a device as described in the foregoing to provide stability improvement in the case of a revolving load the fluctuations in angular velocity in one direction of rotation are reduced substantially. However, in the opposite direction of rotation they increase considerably, when the no-load situation is ignored.

We claim:

1. A device for improving the rotational stability of the rotor of a single-phase synchronous motor said device comprising:
   a motor exhibiting an average torque on which strong alternating torques are superimposed and having a drive shaft driving a rotating load; said motor also comprising a magnetic rotor having a detent torque and arranged in an apparatus housing between a stator comprising exciter coils;
   a cam-and-follower mechanism mounted on said drive shaft and comprising at least one radial surface, at least one lever arm and at least one follower wheel journalled therein, for exerting an additional mechanical compensation torque which acts outside the load-transmission path and which counteracts the electromechanical alternating torques of the motor during nominal operation in one predetermined direction of rotation;
   a resilient blocking element arranged between the lever arm and the follower wheel, which blocking element bears against a radial surface of the cam-and-follower mechanism and blocks the rotation of the rotor in a direction other than the predetermined direction at the same time that the said mechanism acts to counteract the electromechanical alternating torques of the motor; and
   wherein the detent torque and the mechanical compensation torque rotate the rotor sufficiently far out of the parallel position of the stator field and the rotor field to enable starting for the prevailing starting friction.

2. A device as claimed in claim 1 wherein said additional mechanical compensation torque counteracts electromechanical alternating torques of the motor in the positive direction of rotation of the rotor, the positive direction of rotation being that direction in which the torque exerted on the rotor by the current becomes initially zero, and in which subsequently, shifted through a small angle, the magnetic detent torque, which exists when the stator coils are not energized, also becomes zero while, at the same time, the rotor occupying a stable rest position and the opposite direction of rotation being blocked.

3. A device as claimed in claim 1 wherein the cam-and-follower mechanism comprises a cam arranged on the rotor shaft and at least one rotatably journalled follower wheel, the follower wheel following and pressing against the cam.

4. A device as claimed in claim 1 wherein the blocking element abuts a blocking surface in the undesired direction of rotation.

5. A device as claimed in claim 4 wherein the blocking element is an injection-molded plastics part arranged on the same element as the follower wheel.

6. A device as claimed in claim 13 wherein the harmonics of the electromagnetic motor torque and the mechanical compensation torque having substantially equal amplitudes are in phase opposition for a predetermined direction of rotation.

7. A device as claimed in claim 1 wherein pressure and a resilient action are provided by means of a compression spring which bears against an abutment, the spring having such an initial pressure and spring constant that for given cam dimensions the amplitudes of the harmonics of the electromagnetic motor torque and the mechanical compensation torque are substantially equal.

8. A device as claimed in claim 7 wherein the angle between the major cam axis and the direction of the rotor is such that the harmonics of the electromagnetic motor torque and of the mechanical compensation torque are in phase opposition when their amplitudes are substantially equal in a predetermined direction of rotation during nominal operation of the device.

9. A device as claimed in claim 3 wherein the circumferential surface of the follower wheel or the cam is elastic.

10. A device as claimed in claim 9 wherein the elasticity of the circumferential surface of the follower wheel or the cam is obtained by means of an elastic ring mounted on said surface.

11. A device for improving the rotational stability of the rotor of a single-phase synchronous motor which comprises:

a motor exhibiting an average torque on which strong alternating torques are superimposed, a drive shaft of said motor driving a rotating load; said motor also comprising a permanent-magnetic rotor having a detent torque and arranged in an apparatus housing;

a cam-and-follower mechanism mounted on said motor drive shaft for exerting an additional mechanical compensation torque which acts outside the load-transmission path and which counteracts the electromechanical alternating torques of the motor during nominal operation in a predetermined direction of rotation, said mechanism comprising (i) a cam arranged on the drive shaft; (ii) at least one rotatably journalled follower wheel which follows and resiliently presses against the cam; (iii) at least one lever arm pivotal about a pivot carrying said follower wheel; and (iv) a compression spring which bears against said lever arm and resiliently presses said follower wheel against the cam;

a resilient plastic blocking element arranged between the lever arm and the follower wheel which element bears against a radial surface of the follower wheel or one of the follower wheels, said surface having a blocking surface against which the blocking element abuts in the undesired direction of rotation;

wherein:

the circumferential surface of at least the follower wheel or the cam is elastic; the detent torque and the mechanical compensation torque rotate the rotor sufficiently far out of the parallel position of the stator field and the rotor field to enable starting for the prevailing starting friction; and the amplitudes of the harmonics of the electromagnetic motor torque and the mechanical compensation torque are substantially equal and are in phase opposition for a predetermined positive direction of rotation during operation of the device.

* * * * *